(12) United States Patent
Ogawa et al.

(10) Patent No.: US 6,319,588 B1
(45) Date of Patent: Nov. 20, 2001

(54) BIAXIALLY ORIENTED POLYESTER FILM

(75) Inventors: Tatsuya Ogawa; Hideaki Watanabe, both of Kanagawa (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 09/424,359

(22) PCT Filed: Mar. 25, 1998

(86) PCT No.: PCT/JP98/01331

§ 371 Date: Nov. 23, 1999

§ 102(e) Date: Nov. 23, 1999

(87) PCT Pub. No.: WO99/48954

PCT Pub. Date: Sep. 30, 1999

(51) Int. Cl.⁷ ............ B32B 27/20; B32B 27/18; B32B 27/36

(52) U.S. Cl. ............ 428/141; 428/323; 428/327; 428/330; 428/331; 428/338; 428/403; 428/404; 428/405; 428/480; 428/694 ST; 428/694 SG

(58) Field of Search .................... 428/141, 323, 428/327, 330, 331, 480, 694 ST, 694 SG, 694 SL, 910, 403, 404, 405, 338

(56) References Cited

U.S. PATENT DOCUMENTS 4,761,327 * 8/1988 Hamano et al. ............ 428/220

FOREIGN PATENT DOCUMENTS

| | | |
|---|---|---|
| 0 811 653 * | 12/1997 | (EP) . |
| 62-256304 * | 11/1987 | (JP) . |
| 1-223156 | 9/1989 | (JP) . |
| 01-223156 * | 9/1989 | (JP) . |
| 4-33927 | 2/1992 | (JP) . |
| 04-033927 * | 2/1992 | (JP) . |
| 7-3130 | 1/1995 | (JP) . |
| 07-003130 * | 1/1995 | (JP) . |
| 08-059973 * | 3/1996 | (JP) . |
| 8-59973 | 3/1996 | (JP) . |
| 811653 | 12/1997 | (JP) . |
| 932808 | 7/1999 | (JP) . |
| 950681 | 10/1999 | (JP) . |

* cited by examiner

*Primary Examiner*—Vivian Chen
(74) *Attorney, Agent, or Firm*—Sughrue, Mion, Zinn, Macpeak & Seas, PLLC

(57) ABSTRACT

Provided is a biaxially oriented polyester film characterized in that the film contains silicone resin fine particles A which has an average particle diameter of 0.8 to 2.0 μm and whose 80% or more by weight comprises a bonding unit expressed by the formula shown below in an amount of 0.0001 to 0.03% by weight, and contains inert fine particles B which has an average particle diameter smaller than that of said silicone resin fine particles A in an amount of 0.05 to 1.0% by weight, and characterized in that the film has a small amount of coarse protrusions, is excellent in lubricity, winding properties and abrasion resistance, and has suitable characteristics as a base film especially for magnetic recording medium use or condenser use.

$$RSiO_{3/2}$$

(Here, R is at least one kind selected from alkyl groups each having a carbon number of 1 to 6 and phenyl groups).

22 Claims, 1 Drawing Sheet

BIAXIALLY ORIENTED POLYESTER FILM

TECHNICAL FIELD

The present invention relates to a biaxially oriented polyester film. More specifically, it relates to a biaxially oriented polyester film containing an extremely small amount of coarse protrusions, having excellent lubricity, winding properties and abrasion resistance, and useful especially for a magnetic recording medium or a condenser.

BACKGROUND ART

A biaxially oriented polyester film typified by a polyethylene terephthalate film is used for various uses, especially for a magnetic recording medium, a condenser or the like due to its excellent physical and chemical properties.

In the biaxially oriented polyester film, lubricity and abrasion resistance are crucial factors which greatly influence the handling properties at the film manufacturing step and the processing step, and which further greatly influence the quality of the product. When these properties are poor, the biaxially oriented polyester film has a problem, for example, in the application process of a magnetic layer on the surface of the film for using this as a magnetic tape, the friction between the coating roll and the surface of the film is strong, and the abrasion of the film is heavy, and the film is apt to undergo wrinkle and scratch on its surfaces. When the film is used as a base film for a tape of a VTR or a datum cartridge, during the process of taking out from or winding up into a cassette or the like, friction is generated between the film and many guiding parts, a reproducing head or the like, scratching and distortion occur, further white dusts are formed by the abrasion of the surface of a base film, and so forth. These often become the causes of the occurrence of a so-called drop-out.

There have been many studies concerning these problems, especially a method for adding silicone resin particles (for example, Japanese Unexamined Patent Publication No. 62-172031) has a large improving effect, and is expected to have great potentialities as a technology for solving these problems.

However, even in the film produced by these methods, there have been indicated new problems such as the increase of the amount of white dusts generated under severe conditions, for example, high speed treatment for getting high productivity in the processes of application of magnetic layer and calendering in the production of a videotape, high speed dubbing of a soft tape, repeated running and rewinding, and so forth, which are recently prevailing.

Moreover, conventionally used silicone resin fine particles contain coarse particles and aggregated particles, and the improvement of silicone resin fine particles has been desired because, for example, coarse protrusions, which is called flyspecks, are formed to cause a drop-out when said silicone resin fine particles are applied to a base film for a magnetic recording tape which must have further higher electromagnetic conversion characteristics.

On the other hand, considering condenser use, downsizing and duty enlargement of a condenser become important quality conditions in condenser industry with the advance of recent requirement for downsizing an electric or electronic circuit. In such circumstances, in order to supply the film which is a dielectric material and becomes the base film of a film condenser, the technology to produce thin film is being developed. In the film condenser, why the decreasing of the thickness of the film as a dielectric material is sought is (a) an electrostatic capacity of a condenser is proportional to a permittivity electrode area of a dielectric material, and (b) the electrostatic capacity is inversely proportional to the thickness of the film, in other words, the dielectric capacity per unit volume of a dielectric material is inversely proportional to the square of the thickness of a film and proportional to the permittivity. Thereby, it becomes inevitable to decrease the thickness of a film for downsizing or duty enlargement of a condenser as far as a dielectric material having a same permittivity is used.

It is important to decrease the thickness of a film, but the simple decreasing of the thickness in a conventional stretched-film has the problems shown below. For example, as the thickness of the film decreases, handling properties in the steps of the evaporation of an electrode on the film, the slitting of the evaporated film, the winding of raw tape and so on become poor.

These handling properties are related to the lubricity of a film, and in order to improve the lubricity, a method imparting fine concavo-convex deformations to the surfaces of the film is generally known in a thermoplastic resin film. As examples of such a method, a technology (an external particle-addition method) in which inert particles are added during or after the polymerization of the thermoplastic polymer which is a raw material of the film and a technology (an internal particle deposition method) in which a part or the whole of the catalyst or the like which is used for polymerization of the thermoplastic polymer is deposited into the polymer during the reaction processes are known.

However, in a method for producing an ultra-thin film, when a polymer is subjected to a process for producing a thinner film without increasing the concentration of inert fine particles, the number of the inert fine particles per unit area decreases, the distances between fine particles on the surface increase, the film surface becomes flat, and as a result, the lubricity tends to lower. In order to make up for the lowering of fluidity which is accompanied by the decrease of the thickness of the film, it is required to increase the concentration of the inert fine particles added or to increase the diameters of the particles as the thickness of the film decreases.

In this case, owing to poor affinity between the inert fine particles and the thermoplastic polymer, a large number of voids are formed on interfaces, i.e., around the inert particles, especially during melt extrusion or drawing at a high draft ratio, and as the result of the formation of said voids, not only mechanical properties (for example, breaking strength and breaking elongation) of the obtained film are extremely deteriorated or a breakdown voltage extremely lowers, but also ruptures are apt to occur during the production of the film, and resultingly there have been problems of the fall of productivity and the lack of stability of production conditions.

BRIEF DESCRIPTION OF DRAWINGS

In FIG. 1, numeral 1 indicates an unwinding reel, numeral 2 indicates a tension controller, numerals 3, 5, 6, 8, 9 and 11 indicate free rollers, numeral 4 indicates a tension detector (inlet), numeral 7 indicates a fixed pin, numeral 10 indicates a tension detector (outlet), numeral 12 indicates a guide roller, and numeral 13 indicates a wind-up reel.

PROBLEMS TO BE SOLVED BY THE INVENTION

Figure 1:
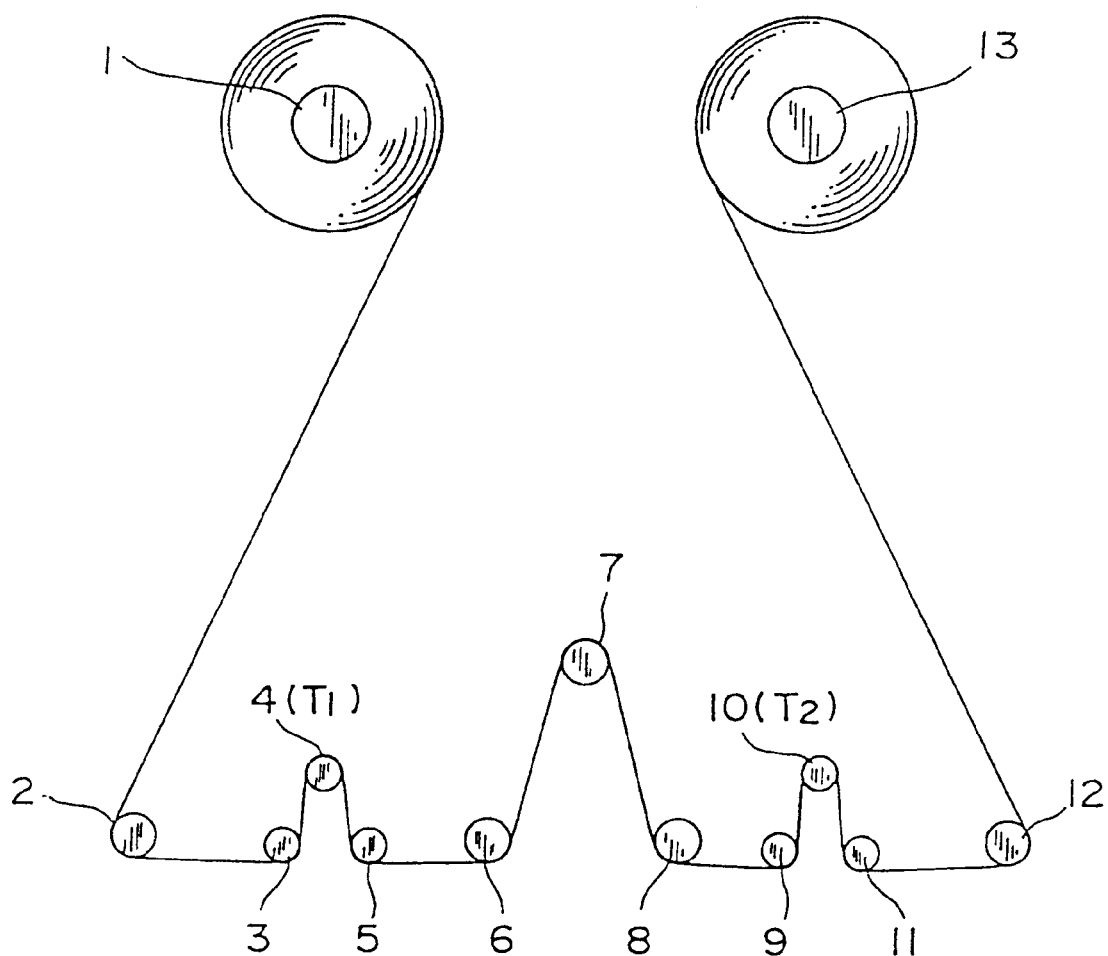
FIG. 1 is a schematic diagram of an apparatus for measuring running friction coefficient.

The inventors of the present invention zealously pursued studies for solving these problems and have completed the present invention by finding that when a combination of specific silicone resin fine particles and other inert particles are compounded in a polyester film, the above-mentioned problems can be solved, and a biaxially oriented polyester film suitable for a magnetic recording medium and a condenser is obtained.

Means for Solving the Problems

Namely, the present invention provides a biaxially oriented polyester film characterized in that it contains silicone resin fine particles A which has an average particle diameter of 0.8 to 2.0 μm and whose 80% or more by weight comprises a bonding unit expressed by the following formula in an amount of 0.0001 to 0.03% by weight, and inert fine particles B which has an average particle diameter smaller than the above-mentioned silicone resin fine particles A in an amount of 0.05 to 1.0% by weight.

$$RSiO_{3/2}$$

(Here, R is at least one kind selected from alkyl groups each having a carbon number of 1 to 6 and phenyl groups).

The polyester of the present invention is a polyester whose main acid component is an aromatic dicarboxylic acid and main glycol component is an aliphatic glycol. Such a polyester has a substantially linear structure, and has film-forming properties, and it can form a film especially by melt process. Examples of the aromatic dicarboxylic acid are terephthalic acid, 2,6-naphthalenedicarboxylic acid, isophthalic acid, diphenoxyethanedicarboxylic acid, biphenyldicarboxylic acid, diphenyletherdicarboxylic acid, diphenylsulfonedicarboxylic acid, diphenylketonedicarboxylic acid, anthracenedicarboxylic acid and the like. Examples of he aliphatic glycol are polymethylene glycols having a carbon number of 2 of 10 such as ethylene glycol, trimethylene glycol, tetramethylene glycol, pentamethylene glycol, hexamethylene glycol, decamethylene glycol and the like, an alicyclic diol such as 1,4-cyclohexanedimethanol, and the like.

The polyester whose main components are an alkylene terephthalate and/or an alkylene naphthalate is preferably used in the present invention.

Among such polyesters, including especially polyethylene terephthalate and polyethylene 2,6-naphthalate, the copolyester comprising, for example, terephthalic acid and/or 2,6-naphthalenedicarboxylic acid in an amount of 80 mol % or more of the total dicarboxylic acid components and ethylene glycol in an amount of 80 mol % or more of the total glycol components is preferable. In this case, 20 mol % or less of the total dicarboxylic acid components can be the above-mentioned aromatic dicarboxylic acids other than terephthalic acid and/or 2,6-naphthalenedicarboxylic acid, or can be, for example, an aliphatic dicarboxylic acid such as adipic acid, sebacic acid or the like, an alicyclic dicarboxylic acid such as cyclohexane-1,4-dicarboxylic acid, or the like. Further, 20 mol % or less of the total glycol components can be the above-mentioned glycols other than ethylene glycol, or can be, for example, an aromatic diol such as hydroquinone, resorcin, 2,2-bis(4-hydroxyphenyl) propane or the like, an aliphatic diol having an aromatic ring such as 1,4-dihydroxydimethylbenzene, a polyalkylene glycol (a polyoxyalkylene glycol) such as polyethylene glycol, polypropylene glycol, polytetramethylene glycol or the like, or the like.

Further, the polyester of the present invention includes, for example, a polyester obtained by the copolymerization or bonding of a component derived from an oxy-carboxylic acid such as an aromatic oxy-acid like hydroxybenzoic acid, an aliphatic oxy-acid like ω-hydroxycaproic acid, or the like in an amount of 20 mol % or less based on the total amount of dicarboxylic acid components and oxy-carboxylic acid components.

The silicone resin fine particles A to be contained in the polyester of the present invention are silicone resin particles containing a bonding unit expressed by the following formula in an amount of 80% or more by weight.

$$RSiO_{3/2}$$

(Here, R is at least one kind selected from alkyl groups each having a carbon number of 1 to 6 and phenyl groups).

The above-mentioned bonding unit has the structure of the following structural formula.

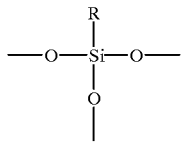

Here, R is same as mentioned above.

The above-mentioned silicone resin fine particles can be produced according to a known production process, for example, a process comprising the hydrolysis of an organo trialkoxysilane and the condensation (e.g. Japanese Examined Patent Publication No. 40-14917, Japanese Examined Patent Publication No. 2-22767 or the like), a process for producing polymethylsilsesquioxane fine particles by using methyltrichlorosilane as a starting raw material (e.g. Belgian Patent Publication No. 572412) or the like. In the present invention, the production process of the silicone resin particles however is not limited as far as the conditions described later are satisfied, and silicone resin fine particles produced by any process can be used.

R in the above-mentioned formulae [formula 1 to formula 3] or structural formula [formula 4] is at least one kind selected from alkyl groups each having a carbon number of 1 to 6 and phenyl groups. Examples of the alkyl group are a methyl group, ethyl group, propyl group, butyl group, pentyl group or hexyl group, or the like. The alkyl group can be composed of one or more kinds of alkyl groups. When R consists of plural groups, for example, a methyl group and an ethyl group, the silicone resin particle can be produced by using a mixture of methyltrimethoxysilane and ethyltrimethoxysilane as starting raw materials. This is true, but considering the production cost and the simplicity of production process, the fine particles of the silicone resin (polymethylsilsesquioxane) whose R is a methyl group is preferred.

The above-mentioned silicone resin fine particles A are preferably in the shape of a substantial sphere, especially preferably in the shape of a true sphere for efficiently imparting lubricity to the film.

The silicone resin fine particles A of the present invention are obtained by polymerization preferably in the presence of a surfactant. The silicone resin fine particles A obtained by this process can impart good quality having a small amount of coarse protrusions, for example, when used for a film.

Examples of the surfactant include a polyoxyethylene alkyl ether, polyoxyethylene alkylphenyl ether, polyoxyethylenesorbitanalkyl ester and alkylbenzenesulfonic acid salt, and the like. A polyoxyethylene alkylphenyl ether and an alkylbenzenesulfonic acid salt are especially preferably used in the polymerization for the silicone resin fine particle. The preferable concrete example for the polyoxyethylene alkylphenyl ether is the ethylene oxide adduct of nonylphenol, and that for the alkylbenzenesulfonic acid salt is sodium dodecylbenzenesulfonate.

The silicone resin fine particles A of the present invention are used preferably after their surfaces have been treated with a silane coupling agent since abrasion resistance is further improved.

Examples of the silane coupling agent include vinyltriethoxysilane, vinyltrichlorosilane, vinyltris(β-methoxyethoxy)silane and the like, which have an unsaturated bond, N-β-(aminoethyl)-γ-aminopropylmethyldimethoxysilane, N-β(aminoethyl)γ-aminopropyltrimethoxysilane, γ-aminopropyltrimethoxysilane, γ-aminopropyltriethoxysilane, N-phenyl-γ-aminopropyltrimethoxysilane or the like, which are aminosilane compounds, β-(3,4-epoxycyclohexyl)ethyltrimethoxysilane, γ-glycidoxypropyltrimethoxysilane, γ-glycidoxypropylmethyldiethoxysilane, γ-glycidoxypropyltriethoxysilane and the like, which are epoxysilane compounds, γ-methacryloxypropylmethyldimethoxysilane, γ-methacryloxypropyltrimethoxysilane, γ-methacryloxypropylmethyldiethoxysilane, γ-methacryloxypropyltriethoxysilane and the like, which are methacrylate silane compounds, further γ-mercaptopropyltrimethoxysilane, γ-chloropropyltrimethoxysilane and the like. Among these, the epoxysilane coupling agent is preferable from the points of view of easy handleability, with standingness against coloring and large effect of abrasion resistance when it is added to the polyester and so forth.

The surface treatment of silicone resin fine particles comprising the following steps is practical and preferable: separating silicone resin fine particles by treating the slurry (aqueous slurry or organic solvent slurry) of silicone resin fine particles directly after synthesis with a filter, a centrifugal separator or the like; subsequently re-slurrying the separated silicone resin fine particles before drying with the water or organic solvent in which a silane coupling agent is dispersed; repeatedly separating fine particles after heat treatment; subsequently drying the separated fine particles; and further subjecting the separated fine particles to a heat treatment depending on the kind of the coupling agent. But, the silicone resin fine particles separated in the first step may be dried before re-slurrying in the second step.

Hereafter, examples of the manufacturing of silicone resin fine particles are shown.

To the upper layer of 7000 g of an aqueous solution containing 0.06% sodium hydroxide by weight placed in a 10-liter glass container provided with a stirring blade is slowly poured 1000 g of methyltrimethoxysilane containing 0.01% ethylene oxy adduct of nonyl phenol to form two layers, subsequently these are allowed to perform interface reaction for 2 hours at 10 to 15° C. under slight stirring to produce sphere particles. Then, the reaction mixture is kept for about 1 hour for aging after the temperature of the reaction system has been warmed up to 70° C., then cooled and filtered with a reduced pressure filter to obtain a cake-shaped silicone resin fine particles having a water content of about 40%. Subsequently, 4000 g of an aqueous solution in which γ-glycidoxypropyltrimethoxysilane as a silane coupling agent is dispersed at a concentration of 2% by weight is placed in another glass container, to the solution is added the whole of the cake-shaped product obtained in the above reaction, this is slurried, the surface treatment of the solid is carried out at an inner temperature of 70° C. over 3 hours under stirring, and this reaction mixture is cooled and subjected to filtration with a reduced pressure filter to obtain a cake-shaped product. Subsequently, the cake-shaped product is re-slurried by adding the whole cake to 600 g of pure water, the slurry is stirred at room temperature for 1 hour, subsequently the slurry is filtered again with a reduced pressure filter to obtain a cake-shaped product, which is free from the excess emulsifier and silane coupling agent and having a water content of about 40%. Finally, this cake-shaped product is treated for 10 hours at 100° C. under 15 torr to obtain about 400 g of silicone resin fine particles little in the content of coagulated particles.

The obtained fine particles are spherical in the shape of particle, and further the particle-size distribution determined by a centrifugal deposition method shown above is narrow.

The followings are the assumed mechanisms by which silicone resin fine particles A, which is preferably used in the present invention and whose surfaces have been treated with a silane coupling agent, prevent the generation of white dusts or the like and improves abrasion resistance: firstly, for example, a starting raw material component, the unreacted portion of the hydrolyzate of organotrialkoxysilane which is one of the raw materials, the terminal silanol groups in the silicone resin or the like is chemically linked to the silane coupling agent to be stabilized, and this prevents the uneven deposition to the surface of the film of these materials or their dissipation, which occurs in the untreated state; and further, the absorption of the silane coupling agent to the particles improves the affinity of the silicone resin fine particles to the polyester, which is originally considered poor, and thereby the failings of fine particles caused by abrasion and the generation of white dusts consisting of the abraded powder of the polyester in the peripheries of fine particles or the like are suppressed.

The silicone resin fine particles A of the present invention has an average particle diameter of 0.8 to 2.0 µm, preferably 0.8 to 1.6 µm. When the average particle diameter is less than 0.8 µm, the improving effects on lubricity and winding properties are small. On the other hand, when the average particle diameter is larger than 2.0 µm, the deterioration of abrasion resistance and the deterioration of electromagnetic conversion characteristics caused by loss of the smoothness of the surface of a film are observed in magnetic recording medium use, and further, the increases of space factor and electrical insulation defect unfavorably occur in condenser use.

Further, the silicone resin fine particles A of the present invention have the apparent Young's modulus preferably of 10 to 100 kg/mm$^2$, more preferably of 10 to 50 kg/mm$^2$. When the apparent Young's modulus is less than 10 kg/m$^2$, the particles added into a film cannot withstand the stress generated on the drawing of the film, resultingly the particles are deformed, and high protrusions needed for imparting lubricity and improving winding properties are hardly formed. On the other land, when the apparent Young's modulus is larger than 100 kg/mm$^2$, the hardness of the particles are too strong, the shock resistance is poor, and the particles are apt to fall; and thereby the film is suffered from the deterioration of abrasion resistance and the lowering of a breakdown voltage.

The content of the silicone resin fine particles A of the present invention is 0.0001 to 0.03% by weight, preferably 0.0001 to 0.02% by weight, further preferably 0.0001 to 0.01% by weight. When the content is too low, the abrasion resistance and winding properties become poor. On the other hand, when the content is too high, the surface of the film becomes rough, and this unfavorably causes the deterioration of electromagnetic conversion characteristics and the deterioration of abrasion resistance in the use for a magnetic recording medium, and the increase of a space factor and the lowering of a breakdown voltage in the use for a condenser.

In the present invention, inert fine particles B to be compounded in the polyester is required to have an average particle diameter smaller than that of the above-mentioned silicone resin fine particles A. When the average particle diameter of the inert fine particles B is equal to or larger than the average particle diameter of the silicone resin fine particles A, the effect of the addition of the silicone resin fine particles A is low, and the abrasion resistance is poor.

The average particle diameter of the inert fine particles B is preferably in the range of 0.1 to 1.2 μm, more preferably in the range of 0.1 to 0.8 μm. These ranges are preferred because of the large improving effects on lubricity and abrasion resistance.

Regarding the kind of the inert fine particles B, the same kind as the silicone resin fine particles A can be used; however, a different kind is preferable from the view point of giving a function different from that which the silicone resin fine particles A gives.

Examples of the kind of the inert fine particles B includes (1) silicon dioxide (including its hydrate, silica sand, quartz or the like); (2) alumina compounds having various crystal forms; (3) silicic acid salts containing an $SiO_2$ component in an amount of 30% or more by weight [for example, amorphous or crystalline clay minerals, aluminosilicate (including its burned product and hydrate) chrysotile, zircon, fly ash or the like]; (4) oxides of Mg, Zn, Zr and Ti; (5) sulfuric acid salts of Ca and Ba; (6) phosphoric acid salts of Li, Ba and Ca (containing its mono-hydrogen salts and dihydrogen salts); (7) benzoic acid salts of Li, Na and K; (8) terephthalic acid salts of Ca, Ba, Zn and Mn; (9) titanic acid salts of Mg, Ca, Ba, Zn, Cd, Pb, Sr, Mn, Fe, Co and Ni; (10) chromic acid salts of Ba and Pb; (11) carbon (for example, carbon black, graphite or the like); (12) glass (for example, glass powder, glass beads or the like); (13) carbonic acid salts of Ca and Mg; (14) fluorite; (15) spinel-type oxides; or the like. Calcium carbonate and spherical silica are preferred in that they impart excellent lubricity and abrasion resistance to the film.

In the present invention, the content of the inert fine particles B is required to be in the range of 0.05 to 1.0% by weight. When the content is less than 0.05% by weight, the lubricity of the film becomes poor. On the other hand, when it is larger than 1.0% by weight, the abrasion resistance of the film becomes poor. The content is preferably 0.1 to 0.6% by weight, more preferably 0.2 to 0.4% by weight.

The biaxially oriented polyester film of the present invention has a central line average roughness Ra of film surface preferably of 0.01 to 0.1 μm. When the central line average roughness Ra is less than 0.01 μm, the surface is too flat, and the improving effects on lubricity and winding properties are small. On the other hand, when it is larger than 0.1 μm, the deterioration of abrasion resistance and that of electromagnetic conversion characteristics in the use for a magnetic recording medium, and the increase of a space factor and the lowering of a breakdown voltage in the use for a condenser are apt to occur. Further, when the biaxially oriented polyester film of the present invention is used as a base film for a magnetic recording medium, the central line average roughness Ra of in the range of 0.01 to 0.025 μm is especially preferable since such a central line average roughness Ra has a large improving effect on electromagnetic conversion characteristics of the film and thereby the film having such a central line average roughness Ra can be used for a high density magnetic recording medium.

The biaxially oriented polyester film of the present invention has a three-dimensional 10-point average roughness SRz of film surface preferably of 0.25 to 1.2 μm. When the three-dimensional 10-point average roughness SRz is less than 0.25 μm, the improving effects on lubricity and winding properties are small. On the other hand, when it is larger than 1.2 μm, the deterioration of abrasion resistance and that of electromagnetic conversion characteristics in the use for a magnetic recording medium, and the increase of a space factor and the lowering of a breakdown voltage in the use for a condenser are apt to occur.

Further, when the biaxially oriented polyester film of the present invention is used as a base, film for a magnetic recording medium, the three-dimensional 10-point average roughness SRz of in the range of 0.25 to 0.8 μm is especially preferable since such a three dimensional 10-point average roughness SRz has a large lowering effect on the frequency of drop-outs and a large improving effect on electromagnetic conversion characteristics of the film and thereby the film having such a three dimensional 10-point average roughness SRz can be used for a high density magnetic recording medium.

It is preferable that the biaxially oriented polyester film has a winding property index of 100 or less at a winding speed of 200 m/min when it is used for a magnetic recording medium. When the winding property index is 100 or less, the improving effect on the winding properties is preferably prominent. On the other hand, the winding property index of larger than 100 is not preferred because when the film is wound up at a high speed, a roll shape becomes poor, that is, the edge surface becomes irregular and so forth, and in a terrible case, the roll is unfavorably collapsed while it is being wound up. The winding property index at a winding speed of 200 m/min is more preferably 85 or less, especially preferably 70 or less.

When the biaxially oriented polyester film of the present invention is used for a condenser, the space factor is preferably 3 to 23%.

The space factor i; a value obtained from the following equation) in which $t_1$ (μm) is a weight-method thickness obtained from the weight w (g) of a 100 $cm^2$-sample film and the density d ($cm^3$/g), and $t_2$ (μm) is a thickness of one sheet of the sample film determined by piling 10 sheets of 100-cm square sample film and measuring the thickness using a micrometer.

$$\text{Space factor } F(\%)=100-t_1/t_2\times 100$$

When the space factor is less than 3%, the lubricity and workability (handling properties) of the film are insufficient. On the other hand, when it exceeds 23%, the condenser capacity per volume is low, and this is not suitable for downsizing.

When the biaxially oriented polyester film of the present invention is used for a condenser, the breakdown voltage (BDV) is preferably 200 V/μm or more from the point of view of an electric insulating material.

Further, when the biaxially oriented polyester film of the present invention is used for a condenser, the CR value (insulation resistance) oft he film is preferably 1000 ωF or more. When the CR value is less than 1000 ωF, the insulation resistance of the film is insufficient, and such a film is sometimes not suitable as an electric insulating material.

It is preferable that the biaxially oriented polyester film of the present invention has the thickness in the range of 0.5 to 25 μm since such a film can be used widely from magnetic recording use to condenser use. However, when the film is used for a condenser, the thickness is more preferably 0.5 to 10 μm, especially preferably 0.5 to 5 μm. The film having such thickness is more preferable since it is easy in downsizing when a condenser is produced by using said film.

The biaxially oriented polyester film of the present invention can be produced basically by a conventionally known method or a method which has been accumulated in the art. For example, at first an undrawn film is produced, and subsequently it is subjected to biaxial orientation to obtain the objective film. Said undrawn film can be obtained as follows: for example, a polyester is melt extruded into a film shape at a temperature of from the melting point (Tm:° C.) to (Tm+70)° C.; and the film-shaped material is quenched to solidify to obtain an undrawn film having an intrinsic viscosity of 0.35 to 0.9 dl/g.

This undrawn film is further converted into a biaxially oriented film according to a biaxially oriented film's production method which has been accumulated up to now. For example, the undrawn film is drawn in one direction (the longitudinal direction or transverse direction) at a temperature of (Tg−10)° C. to (Tg+70)° C. (here, Tg is the glass transition temperature of the polyester) at a draft ratio of 2.5 to 7.0, and subsequently, in the direction perpendicular to the above direction (when the first drawing is in the longitudinal direction, the second drawing is carried out in the transverse direction) at a temperature of Tg° C. to (Tg+70)° C. at a draft ratio of 2.5 to 7.0. In this case, the area draft ratio is preferably 9 to 32, more preferably 12 to 32. The drawing means can be either simultaneous orientation or sequential biaxial orientation. Further, the obtained biaxially oriented film can be heat-set at a temperature of (Tg+70)° C. to Tm° C. For example, for polyethylene terephthalate, the heat set is preferably carried out at a temperature of 190° C. to 230° C.. The heat-set time is, for example, 1 to 60 seconds.

The biaxially oriented polyester film of the present invention contains specific silicone resin fine particles and another kind of inert particles having an average particle diameter smaller than that of the silicone resin fine particles in combination and thereby exhibits the synergetic effect attributable to excellent properties of each kind of particles. Therefore, the film has extremely small amount of coarse protrusions, and it is especially excellent in lubricity, winding properties and abrasion resistance, and is extremely useful for a magnetic recording medium and for a condenser.

Various kinds of physical properties and characteristics of the present invention were measured and/or are defined as follows.

(1) Average Particle Diameter of Particles (i) The Case of Measuring an Average Particle Diameter from Powdery Particles A cumulative curve was calculated from particle diameters and the amounts of the particles of the particle diameters on the basis of the centrifugal sedimentation curve obtained with a centrifugal particle size analyzer (Model CP-50, supplied by Shimadzu Corporation), and the particle diameter corresponding to a 50 mass percent in the cumulative curve was taken as the average particle diameter (Particle Size Measuring Technology, Nikkan Kogyo Shimbun, 1975, pages 242–247).

(ii) The Case of Particles Present in a Film

A small piece of a sample film was fixed on the sample bed of a scanning electron microscope, and the film surface was ion-etched with a sputtering apparatus (JFC-1100 ion etching apparatus, supplied by Nippon Denshi K.K.) under the following conditions. The sample was placed in a bell jar, the vacuum degree was increased up to about $10^{-3}$ torr, and the ion etching was carried out at a voltage of 0.25 kV at a current of 12.5 mA for about 10 minutes. Further, gold was sputtered on the film surface with the same apparatus, and the film surface was observed with a scanning electron microscope at a magnification of 50,000 to 10,000, to determine the distribution of area-circle-corresponding diameters of at least 100 particles with Luzex 500 supplied by Nippon Regulators K.K. The average particle diameter was determined from the point of 50% cumulative weight.

(2) Particle Apparent Young's Modulus

A micro-compression tester MCTM-201 supplied by Shimadzu Corporation was used. A diamond presser was moved down at a constant load rate (29 mgf/second) to exert external force on one particle. The apparent Young's modulus Y was determined according to the following equation in which P is a load (Kgf) when the particle is broken, Z is a deviation (mm) of the presser when the particle is broken and d is the diameter (mm) of the particle. The above procedure was repeated 10 times, and the average of the ten measurement data was taken as the apparent Young's modulus.

$$Y=2.8P/\pi dZ$$

(3) Film Surface Roughness (Ra)

The measurement value is the value defined as a central line average surface roughness (Ra) according to JIS-B0601, and in the present invention, a film was measured with a needle-contacting type surface roughness tester (Surfcoder SE-30C, supplied by Kosaka Laboratories Ltd.) under the following conditions.

(a) Needle top radius: 2 μm
(b) Measurement pressure: 30 mg
(c) Cut-off: 0.25 mm
(d) Measurement length: 2.5 mm
(e) How to arrange data: one sample was measured in six places, and the largest value was omitted, and the average of the remaining five values was taken as the central line average surface roughness (Ra).

(4) Three-dimensional Ten-point Average Roughness (SRz)

The three-dimensional surface profile of film surface was imaged by using a three-dimensional roughness tester (SE-3CK, supplied by Kosaka Laboratories Ltd.) under the following conditions: needle diameter of 2 μmR; needle pressure of 30 mg; measuring length of 1 mm; sampling pitch of 42 μm; cutoff of 0.25 mm; magnification in the longitudinal direction of 20,000 and magnification in the transverse direction of 200; and scanning of 100 lines. The area corresponding to the standard area was cut out from the obtained profile, and in said area, the average height of five mountains from the highest mountain to the fifth highest mountain out of the plains parallel to the average line, and the average depth of five valleys from the deepest valley to the fifth deepest valley were determined, and the distance between the average height and the average depth are defined as SRz.

(5) Calender Abrasion Resistance

The abrasion resistance of the running side of a base film was measured using a three-stage mini-super calender under the following conditions: a three-stage calender of a nylon roll and a steel roll was used; a treating temperature of 80° C.; linear load applied on a film of 200 kg/cm; film speed of 100 m/minute. The abrasion resistance of the film was assessed by the stain adhered on the top roller of the calender when the running film run 500 m.

<5 Grade Assessment>

The 1st grade: Completely no stain on the nylon roll.
The 2nd grade: Almost no stain on the nylon roll.
The 3rd grade: A little stain on the roll, but it was easily removed by wiping with a dry cloth.

The 4th grade: The stain on the roll was hardly removed by wiping with a dry cloth, but removed with a solvent such as acetone or the like.

The 5th grade: The nylon roll was badly stained, and the stain was hardly removed even with the solvent.

(6) Blade Abrasion Resistance

Under an environment of a temperature of 20° C. and a humidity of 60%, a blade edge (a blade for an industrial razor test, supplied by GKI in U.S.A.) was allowed to vertically come into contact with the slit film of ½ inch in width and further downwardly pressed so that the blade edge was pushed into the film by 2 mm, the slit film was allowed to run (frictionally) at a rate of 100 m/minute at an inlet tension $T_1$=50 g. After the film ran 100 m, the amount of abrasion dust adhering to the blade was evaluated.

<Assessment>

⊙: The width of the adhering of abrasion dust to the blade edge was less than 0.5 mm.

○: The width of the adhering of abrasion dust to the blade edge was no less than 0.5 mm and less than 1.0 mm.

ΔA: The width of the adhering of abrasion dust to the blade edge was no less than 1.0 mm and less than 2.0 mm.

×X: The width of the adhering of abrasion dust to the blade edge was no less than 2.0 mm.

(7) High-speed Running Abrasion Resistance

Using an apparatus shown in FIG. 1, a high-speed running abrasion resistance was measured in the following manner.

In FIG. 1, numeral 1 indicates an unwinding reel, numeral 2 indicates a tension controller, numerals 3, 5, 6, 8, 9 and 11 indicate free rollers, numeral 4 indicates a tension detector (inlet), numeral 7 indicates a fixed pin, numeral 10 indicates a tension detector (outlet), numeral 12 indicates a guide roller, and numeral 13 indicates a wind-up reel.

Under an environment of a temperature of 20° C. and a humidity of 60%, a slit film of ½ inch in width was allowed to run 200 m at a rate of 300 m/minute in contact with the fixed pin 7 at an angle θ=60° while an inlet tension is adjusted at 50 g. After the running, the amount of the abrasion dust adhered to the fixed pin 7 was evaluated.

Here, a method in which a 6-mm φ tape guide made of stainless steel SUS304 having sufficiently finished surface (surface roughness Ra=0.015 μm) was used as the fixed pin is called the method A.

A method in which a 6-mm φ tape guide made of SUS sintered board by bending into a cylinder shape and having insufficiently finished surface (surface roughness Ra=0.15 μm) was used as the fixed pin is called the method B.

A method in which a 6 mm φ tape guide made of carbon black-containing polyacetal was used as the fixed pin is called the method C.

<Abrasion Dust Assessment>

⊙: No abrasion dust was observed on the tape guide.

○: Abrasion dust was slightly observed on the tape guide.

Δ: The adhesion of abrasion dust on the tape guide was detected at a glance.

×: Abrasion dust heavily adhered on the tape guide.

(8) Running Friction Coefficient (μk) on Low-speed Repeated Running

This was measured using an apparatus shown in FIG. 1 in the following manner.

Under an environment of a temperature of 20° C. and a humidity of 60%, a magnetic tape was allowed to move (frictionally) at a rate of 200 cm/minute in a state where the non-magnetic face of the magnetic tape was made to come into contact with the fixed pin 7 at an angle θ=(152/180)π radian (152°). When a tension $T_1$ at the inlet was adjusted to 35 g with the tension controller 2, and after the reciprocating running of the film was made 50 times, a tension ($T_2$:g) at the outlet was detected with the outlet tension detector, and the running friction coefficient μk was calculated using the following equation.

$$\mu k = (2.303/\theta)\log(T_2/T_1) = 0.868 \log(T_2/50)$$

In repeated running in a VTR, the running state of a tape having running friction coefficient (μm) of 0.25 or more will become unstable, and so a running friction coefficient of no less than 0.25 is judged "poor running durability".

Here, a method in which a 6-mm φ tape guide made of stainless steel SUS304 having sufficiently finished surface (surface roughness Ra=0.015 μm) was used as the fixed pin is called the method A.

A method in which a 6-mm φ tape guide made of SUS sintered board by bending into a cylinder shape and having insufficiently finished surface (surface roughness Ra=0.15 μm) was used as the fixed pin is called the method B.

A method in which a 6 mm φ tape guide made of carbon black-containing polyacetal was used as the fixed pin is called the method C.

The magnetic tapes were prepared as follows. 100 Parts by weight (to be simply referred to as "part" hereinafter) of γ-$Fe_2O_3$ and the following composition were kneaded and dispersed with a ball mill for 12 hours.

| | |
|---|---|
| Polyester-urethane | 12 parts |
| Vinyl chloride-vinyl acetate-maleic anhydride copolymer | 10 parts |
| α-Alumina | 5 parts |
| Carbon black | 1 part |
| Butyl acetate | 70 parts |
| Methyl ethyl ketone | 35 parts |
| Cyclohexanone | 100 parts. |

After the dispersion, the following components were further added.

| | |
|---|---|
| Fatty acid: oleic acid | 1 part |
| Fatty acid: palmitic acid | 1 part |
| Fatty acid ester (amyl stearate) | 1 part |

The resultant mixture was kneaded for 10 to 30 minutes, 7 parts of an ethyl acetate solution of 25% triisocyanate compound was further added, and the mixture was shear-dispersed at a high speed for 1 hour to prepare a magnetic coating liquid.

The obtained coating liquid was applied on a polyester film so that the dry thickness was 3.5 μm.

Subsequently, the coating was subjected to orientation treatment in a direct current magnetic field and dried at 100° C.. Then, the film was calendered and slit to a width of ½ inch to obtain the magnetic tape.

(9) Winding Property Index

A film of ½ inch in width was set in an apparatus shown in FIG. 1 in such a manner that it did not go by way of the fixed pin, the film was allowed to run 200 m at a rate of 200 m/minute under adjustment of a tension $T_1$ at the inlet to 50 g under an environment of a temperature of 20° C. and a humidity of 60%, and the edge position was detected by CCD camera at a position immediately before taken-up with the wind-up reel 13.

Shifting amount of the edge positions were expressed as a shape of waves against a time axis, and the winding property index was calculated from the shape of waves according the following equation.

$$\text{winding property index} = \sqrt{\frac{1}{t}\int_0^1 f(x)^2\,dx}$$

Here, t: measuring time (sec)

x: sifting amount ($\mu$m).

10) Winding Properties

The magnetic tape prepared according to the method described above was set in an apparatus shown in FIG. 1 in such a manner that it did not go by way of the fixed pin 7, the film was allowed to run 500 m at a rate of 400 m/minute under the adjustment of a tension $T_1$ at the inlet to 60 g, and the winding properties were evaluated at the wind-up reel side on the basis of whether the magnetic tape could be wound and the shape of the roll of the tape wound up.

<Assessment>

○: The shift of the edge of the roll formed is not greater than 1 mm.

Δ: The shift of the edge of the roll formed is greater than 1 mm.

×: The magnetic tape could not be wound up.

(11) Number of Coarse Protrusions

Aluminum was evaporated onto the surface of the film, the treated surface was observed under a two-beam interference microscope, the protrusions exhibiting interference fringe of third- or higher-order with the measuring wavelength of 0.54 $\mu$m were counted as coarse protrusions, and the number of coarse protrusions in 5 cm$^2$ was expressed in terms of the number in 1 cm$^2$. The measurement was repeated five times, and the average is expressed as the number of coarse protrusions.

(12) Drop-out

The number of drop-outs of a magnetic tape (½ inch in width) was counted using a commercial drop-out counter (for example, model VH01BZ, supplied by SHIBASOKU) with the threshold set at 5 $\mu$sec×10 dB, and then the count number per 1 minute was calculated.

(13) Electromagnetic Conversion Characteristics

A "VHS" VTR (BR6400, supplied by Victor Co. of Japan, Ltd.) was remodeled, and a signal having a sine wave at 4 MHz was inputted to a recording/reproduction head through an amplifier to record it on a magnetic tape. The signal was reproduced and the reproduced signal was inputted to a spectrum analyzer. A noise generated at a distance of 0.1 MHz from the carrier signal 4 MHz was measured, and the carrier to noise ratio (C/N) was expressed in terms of dB unit. The above-mentioned magnetic tape was measured in this manner, and t he difference between the value obtained and the value obtained in the Comparative Example 5, which was made the standard (±0 dB), was taken as electromagnetic conversion characteristics.

(14) Space Factor (F)

Space factor F was calculated from the following equation using a'weight-method thickness $t_1$ ($\mu$m) obtained from the weight w (g) of a 100 Cm$^2$-sample film and the density d (cm$^3$/g), and $t_2$ ($\mu$m) of a thickness of one sheet of the sample film determined by piling 10 sheets of 10-cm square sample film and measuring the thickness using a micrometer.

$$\text{Space factor } F(\%) = 100 - t_1/t_2 \times 100$$

(15) Breakdown Voltage (BDV)

A breakdown voltage was determined according to the method of JIS C 2318, and an average value (n=100) is taken as breakdown voltage (BDV).

(16) CR Value

A sample film was kept under conditions of at 23° C. and at a humidity of 50% RH for 16 hour for adjusting the condition, and a CR value was measured under an environment of 23° C. and 50% RH, according to the method of JIS C 2319.

(17) Friction Coefficient

A friction coefficient was measured according to ASTM D1894.

(18) Shape of Roll (2)

The shape of the roll which was formed by winding a sample film of 500 mm as long as 500 m was observed, and it was evaluated based on the following criterion.

○: The shape of the roll was good, and no wrinkles on the surface, displacement on a roll and the like were detected by eyes.

×: The shape of the roll was not good, and wrinkles on the surface, displacement on a roll or the like was detected by eyes.

EXAMPLES

The present invention will be explained further in detail hereafter with examples.

Examples 1 to 5, and Comparative Examples 1 to 8

Dimethyl terephthalate and ethylene glycol were polymerized according to a conventional method in the presence of manganese acetate as an ester interchange catalyst, antimony trioxide as a polymerization catalyst, phosphorous acid as a stabilizer, and further additive particles shown in Table 1 in amounts shown in Table 1 as lubricants to obtain a polyethylene terephthalate having an intrinsic viscosity (o-chlorophenol, 35° C.) of 0.56.

Pellets of the obtained polyethylene terephthalate were dried at 170° C. for 3 hours, and then fed to the hopper for an extruder, the pellets were melted at a melting temperature of 280 to 300° C., the molten polymer was extruded through a 1-mm slit die onto a rotary cooling drum having a surface finish of about 0.3 s and having a surface temperature of 20° C. to obtain an undrawn film of 200 $\mu$m in thickness.

The so-obtained undrawn film was preheated up to 75° C., further stretched 3.5 times with high-speed and low-speed rolls under heating with three IR heaters having a surface temperature of 600° C., which were positioned 15 mm above the film. Then the film was rapidly cooled, subsequently fed to a stenter and stretched 4.5 times in the transverse direction at 120° C. The obtained biaxially oriented film was thermoset at 205° C. for 5 seconds to obtain a thermoset biaxially oriented polyester film having a thickness of 14 $\mu$m.

Characteristics of the obtained film as a base film for a magnetic recording medium are shown in Table 2.

TABLE 1

| | Silicone resin fine particle A | | | | | Inert particle B | | |
| --- | --- | --- | --- | --- | --- | --- | --- | --- |
| | Average particle diameter ($\mu$m) | Surfactant species | Silane coupling agent species | Content (wt. %) | Apparent Young's modulus (kgf/mm$^2$) | Particle species | Average particle diameter ($\mu$m) | Content (wt. %) | Thickness of film ($\mu$m) |
| Example 1 | 1.2 | NEO | — | 0.01 | 50 | CaCO$_3$ | 0.6 | 0.15 | 14.0 |
| Example 2 | 1.2 | NEO | — | 0.001 | 50 | CaCO$_3$ | 0.6 | 0.15 | 14.0 |
| Example 3 | 1.2 | SAS | — | 0.01 | 50 | CaCOa | 0.6 | 0.15 | 14.0 |
| Example 4 | 1.2 | NEO | GPS | 0.01 | 50 | CaCO$_3$ | 0.6 | 0.15 | 14.0 |
| Example 5 | 1.2 | — | — | 0.01 | 50 | CaCO$_3$ | 0.6 | 0.15 | 14.0 |
| Comparative Example 1 | — | — | — | — | — | CaCOa | 0.6 | 0.15 | 14.0 |
| Comparative Example 2 | 0.7 | NEO | — | 0.01 | 50 | CaCO$_3$ | 0.6 | 0.15 | 14.0 |
| Comparative Example 3 | 2.3 | NEO | — | 0.03 | 50 | CaCO$_3$ | 0.6 | 0.15 | 14.0 |
| Comparative Example 4 | 1.2 | NEO | — | 0.00005 | 50 | CaCO$_3$ | 0.6 | 0.15 | 14.0 |
| Comparative Example 5 | 1.2 | NEO | — | 0.05 | 50 | CaCO$_3$ | 0.6 | 0.15 | 14.0 |
| Comparative Example 6 | 1.2 | NEO | — | 0.01 | 50 | CaCO$_3$ | 1.3 | 0.15 | 14.0 |
| Comparative Example 7 | 1.2 | NEO | — | 0.01 | 50 | CaCO$_3$ | 0.6 | 1.10 | 14.0 |
| Comparative Example 8 | 1.2 | NEO | — | 0.01 | 50 | CaCO$_3$ | 0.6 | 0.03 | 14.0 |

NEO is nonylphenol ethylene oxide adduct; SAS is sodium alkylbenzenesulfonate; GPS is γ-glycidoxypropyltrimethoxysilane.

TABLE 2

| | Ra ($\mu$m) | SRz ($\mu$m) | Calendar abrasion resistance (grade) | Blade abrasion resistance | High-speed running abrasion Method | | | Low-speed repeated running $\mu$k Method | | | Winding property index | Winding property (1) | No. of coarse protrusion (point/cm$^2$) | Drop-out (piece/minute) | ECC C/N (dB) |
| --- | --- | --- | --- | --- | --- | --- | --- | --- | --- | --- | --- | --- | --- | --- | --- |
| | | | | | A | B | C | A | B | C | | | | | |
| Example 1 | 0.013 | 0.51 | 1st | ◎ | ◎ | ◎ | ◎ | 0.21 | 0.21 | 0.20 | 63 | ○ | 0.6 | 22 | +1.7 |
| Example 2 | 0.012 | 0.48 | 1st | ◎ | ◎ | ◎ | ◎ | 0.23 | 0.22 | 0.22 | 72 | ○ | 0.3 | 15 | +2.0 |
| Example 3 | 0.013 | 0.51 | 1st | ◎ | ◎ | ◎ | ◎ | 0.21 | 0.21 | 0.20 | 62 | ○ | 0.5 | 20 | +1.8 |
| Example 4 | 0.013 | 0.51 | 1st | ◎ | ◎ | ◎ | ◎ | 0.21 | 0.21 | 0.19 | 65 | ○ | 0.7 | 25 | +1.7 |
| Example 5 | 0.014 | 0.65 | 2nd | ○ | ○ | ○ | ○ | 0.23 | 0.24 | 0.22 | 52 | ○ | 1.0 | 35 | +1.3 |
| Comp. Ex. 1 | 0.012 | 0.24 | 1st | ◎ | ◎ | ○ | ○ | 0.23 | 0.23 | 0.23 | 197 | X | 0.1 | 13 | +2.2 |
| Comp. Ex. 2 | 0.014 | 0.31 | 1st | ◎ | ◎ | ○ | ◎ | 0.22 | 0.23 | 0.22 | 137 | Δ | 0.4 | 19 | +1.4 |
| Comp. Ex. 3 | 0.022 | 1.09 | 4th | X | Δ | Δ | ○ | 0.25 | 0.25 | 0.23 | 41 | ○ | 5.3 | 166 | −1.1 |
| Comp. Ex. 4 | 0.012 | 0.24 | 1st | ◎ | ◎ | ○ | ○ | 0.24 | 0.25 | 0.25 | 151 | X | 0.2 | 16 | +2.0 |
| Comp. Ex. 5 | 0.017 | 0.55 | 4th | X | Δ | Δ | ○ | 0.24 | 0.24 | 0.22 | 43 | ○ | 1.8 | 65 | 0 |
| Comp. Ex. 6 | 0.027 | 0.57 | 4th | X | Δ | Δ | Δ | 0.24 | 0.25 | 0.24 | 55 | ○ | 3.1 | 89 | −1.5 |
| Comp. Ex. 7 | 0.030 | 0.72 | 5th | X | ○ | Δ | ○ | 0.21 | 0.21 | 0.20 | 59 | ○ | 0.9 | 31 | −2.0 |
| Comp. Ex. 8 | 0.009 | 0.49 | 1st | ◎ | ◎ | ◎ | ◎ | 0.28 | 0.27 | 0.27 | 126 | Δ | 0.5 | 21 | +2.9 |

Comp. Ex. is Comparative Example, and ECC is Electromagnetic Conversion Characteristics.

Examples 6 and 7, and Comparative Examples 9 to 12

Dimethyl terephthalate and ethylene glycol were polymerized according to a conventional method in the presence of manganese acetate as an ester interchange catalyst, antimony trioxide as a polymerization catalyst, phosphorous acid as a stabilizer, and further additive particles shown in Table 3 in amounts shown in Table 3 as lubricants to obtain a polyethylene terephthalate having an intrinsic viscosity (o-chlorophenol, 35° C.) of 0.56.

Pellets of the obtained polyethylene terephthalate were dried at 170° C. for 3 hours, and then fed to the hopper for an extruder, the pellets were melted at a melting temperature of 280 to 300° C., the molten polymer was extruded through a 1-mm slit die onto a rotary cooling drum having a surface finish of about 0.3 s and having a surface temperature of 20° C. to obtain an undrawn film of 20 $\mu$m in thickness in Comparative Example 10, or an undrawn film of 35 $\mu$m in thickness in another case.

The so-obtained undrawn film was preheated up to 75° C., further stretched 3.6 times with high-speed and low-speed rolls under heating with one IR heater having a surface temperature of 600° C., which were positioned 15 mm above the film. Then the film was rapidly cooled, subsequently fed to a stenter and stretched 4.0 times in the transverse direction at 105° C. The obtained biaxially oriented film was thermoset at 205° C. for 5 seconds to obtain a thermoset biaxially oriented polyester film having a thickness of 1.5 $\mu$m in Comparative Example 10, or that having a thickness of 2.5 $\mu$m in another case. Characteristics of the obtained films as base films for condenser use are shown in Table 3.

The film of the present invention, as clear from Table 2, has extremely small amount of coarse protrusions, is excellent in drop-out resistance and electromagnetic conversion characteristics, and at the same time has excellent lubricity, drawing properties and abrasion resistance; and the film exhibits excellent characteristics for magnetic recording medium use. Further, as clear from Table 4, the film is excellent in each of condenser characteristics, and has excellent lubricity and winding properties; and the film exhibits excellent characteristics also for condenser use.

TABLE 3

| | Silicone resin fine particle A | | | | | Inert particle B | | | |
|---|---|---|---|---|---|---|---|---|---|
| | Average particle diameter (μm) | Surfactant species | Silane coupling agent species | Content (wt. %) | Apparent Young's modulus (kgf/mm²) | Particle species | Average particle diameter (μm) | Content (wt. %) | Thickness of film (μm) |
| Example 6 | 1.2 | NEO | — | 0.01 | 50 | spherical silica | 0.5 | 0.4 | 2.5 |
| Example 7 | 1.2 | NEO | — | 0.01 | 50 | CaCO₃ | 0.6 | 0.4 | 2.5 |
| Comparative Example 9 | — | — | — | — | — | spherical silica | 0.5 | 0.4 | 2.5 |
| Comparative Example 10 | 2.5 | NEO | — | 0.03 | 50 | spherical silica | 0.5 | 0.4 | 1.5 |
| Comparative Example 11 | 0.6 | NEO | — | 0.01 | 50 | spherical silica | 0.5 | 0.4 | 2.5 |
| Comparative Example 12 | 1.2 | NEO | — | 0.01 | 50 | — | — | — | 2.5 |

NEO is nonylphenol ethylene oxide adduct.

TABLE 4

| | Ra (μm) | SRz (μm) | Space factor (F) (%) | BDV (V/μm) | CR value (ΩF) | Friction factor | Winding property (2) |
|---|---|---|---|---|---|---|---|
| Example 6 | 0.024 | 0.54 | 11 | 400 | 80000 | 0.32 | ○ |
| Example 7 | 0.026 | 0.60 | 11 | 400 | 80000 | 0.31 | ○ |
| Comp. Ex. 9 | 0.023 | 0.20 | 2 | 410 | 80000 | 0.43 | X |
| Comp. Ex. 10 | 0.035 | 1.31 | 25 | 340 | 8000 | 0.26 | ○ |
| Comp. Ex. 11 | 0.025 | 0.25 | 3 | 400 | 80000 | 0.42 | X |
| Comp. Ex. 12 | 0.007 | 0.45 | 9 | 400 | 80000 | 0.54 | X |

Comp. Ex. in the table is Comparative Example.

Effects of the Invention

The biaxially oriented polyester film of the present invention has extremely small amount of coarse protrusions, and has excellent lubricity, winding properties and abrasion resistance, and the film has suitable characteristics as a base film especially for magnetic recording medium use or condenser use.

What is claimed is:

1. A biaxially oriented polyester film comprising silicone resin fine particles A which have an average particle diameter of 0.8 to 2.0 μm and whose 80% or more by weight comprises a bonding unit expressed by the formula:

$$RSiO_{3/2}$$

in an amount of 0.0001 to 0.03% by weight, and inert fine particles B which have an average particle diameter smaller than that of said silicone resin fine particles A in an amount of 0.05 to 1.0% by weight, wherein R is at least one group selected from the group consisting of alkyl groups each having a carbon number of 1 to 6 and phenyl groups, wherein the silicone resin fine particles A have been polymerized in the presence of a surfactant, and said surfactant is a polyoxyethylene allylphenyl ether and/or sodium dodecylbenzenesulfonate.

2. A biaxially oriented polyester film of claim 1, wherein the surfaces of the silicone resin fine particles A have been treated with a silane coupling agent.

3. A biaxially oriented polyester film of claim 2, wherein the silane coupling agent is a silane coupling agent having an epoxy group or epoxy groups.

4. A biaxially oriented polyester film of claim 1, wherein the apparent Young's moduli of the silicone resin fine particles A are 10 to 100 kg/mm².

5. A biaxially oriented polyester film of claim 1, wherein the average particle diameter of the silicone resin fine particles A is 0.8 to 1.6 μm.

6. A biaxially oriented polyester film of claim 1, wherein the inert fine particles B are at least one kind selected from calcium carbonate particles and spherical silica particles.

7. A biaxially oriented polyester film of claim 1, wherein the average particle diameter of the inert fine particles B is 0.1 to 1.2 μm.

8. A biaxially oriented polyester film of claim 7, wherein the average particle diameter of the inert fine particles B is 0.1 to 0.8 μm.

9. A biaxially oriented polyester film of claim 1, wherein the central line average roughnesses Ra of the surfaces of the film are 0.01 to 0.1 μm.

10. A biaxially oriented polyester film of claim 1, wherein the three-dimensional 10-point average roughnesses SRz of the surfaces of the film are 0.25 to 1.2 μm.

11. A biaxially oriented polyester film of claim 1, wherein the thickness of the film is 0.5 to 25 μm.

12. A biaxially oriented polyester film of claim 1, wherein the polyester is polyethylene terephthalate.

13. A biaxially oriented polyester film of claim 1, wherein the polyester is polyethylene 2,6-naphthalate.

14. A biaxially oriented polyester film of claim 1, wherein the film is used as a base for a magnetic recording medium.

15. A biaxially oriented polyester film of claim 1 or 14, wherein the central line average roughnesses of the surfaces of the film are 0.01 to 0.025 μm.

16. A biaxially oriented polyester film of claim 1 or 14, wherein the three-dimensional 10-point average roughnesses SRz of the surfaces of the film are 0.25 to 0.8 μm.

17. A biaxially oriented polyester film of claim 1 or 14, wherein the winding property index at a winding rate of 200 m/minute is 100 or less.

18. A biaxially oriented polyester film of claim 1, wherein the film is used as an insulating film in a condenser.

19. A biaxially oriented polyester film of claim 18, wherein the space factor of the film is 3 to 23%.

20. A biaxially oriented polyester film of claim 18, wherein the insulation breakdown voltage of the film is 200 V/μm or more.

21. A biaxially oriented polyester film of claim 18, wherein the CR value of the film is 10000 ΩF or more.

22. A biaxially oriented polyester film of claim 18, wherein the thickness of the film is 0.5 to 5 μm.

* * * * *